United States Patent
Eady

[11] Patent Number: 5,687,633
[45] Date of Patent: *Nov. 18, 1997

[54] INSERT TYPE MEMBER FOR USE IN A FLEXIBLE TYPE PUMP DIAPHRAGM

[75] Inventor: Eldon S. Eady, Greensburg, Pa.

[73] Assignee: Westinghouse Air Brake Company, Wilmerding, Pa.

[*] Notice: The term of this patent shall not extend beyond the expiration date of Pat. No. 5,634,391.

[21] Appl. No.: 677,265

[22] Filed: Jul. 9, 1996

[51] Int. Cl.$^6$ .................................................. F01B 19/00
[52] U.S. Cl. ................... 92/97; 92/98 R; 92/99; 92/103 F
[58] Field of Search ................ 92/96, 98 R, 99, 92/102, 103 F, 105, 97

[56] References Cited

U.S. PATENT DOCUMENTS

| | | | |
|---|---|---|---|
| 2,840,339 | 6/1958 | Price | 92/97 |
| 2,947,325 | 8/1960 | McFarland, Jr. | 92/103 F |
| 3,208,721 | 9/1965 | McHugh | 92/99 |
| 3,282,171 | 11/1966 | Tuckmantel | 92/99 |
| 3,613,518 | 10/1971 | Prosser | 92/98 R |
| 3,950,996 | 4/1976 | Lewis | 92/98 R |
| 5,052,276 | 10/1991 | Halsey | 92/103 F |

FOREIGN PATENT DOCUMENTS

| | | | |
|---|---|---|---|
| 2452748 | 5/1976 | Germany | 92/99 |
| 539401 | 2/1956 | Italy | 92/103 R |

*Primary Examiner*—Thomas E. Denion
*Attorney, Agent, or Firm*—James Ray & Associates

[57] ABSTRACT

An insert member for use in a flexible diaphragm portion of a pump which enables such flexible diaphragm portion of such pump to be provided with a substantially uniform non-obtrusive surface area that will be positioned in such pump for intimate contact with a material to be pumped. Such insert member includes a first disc-like portion having both a first predetermined size and a first predetermined configuration. There is also a second disc-like portion having both a second predetermined size and a second predetermined configuration. The second disc-like portion is secured adjacent one surface thereof to a first surface of the first disc-like portion and such second disc-like portion extends from the first surface of such first disc-like portion for a predetermined distance. This second disc-like portion is disposed substantially in a center portion of the first surface of such first disc-like portion. A plurality of apertures are formed through the first disc-like portion which have a third predetermined size and a third predetermined configuration. This plurality of apertures provides an overall predetermined open area through the first disc-like portion for receiving a rubber compound therein and thereby significantly improve bonding of the improved insert type member to such flexible diaphragm portion of such pump. A securing means is engageable at least with the second disc-like portion for securing the insert member to an elongated piston rod-like member disposed for reciprocal movement within such pump.

22 Claims, 2 Drawing Sheets

INSERT TYPE MEMBER FOR USE IN A FLEXIBLE TYPE PUMP DIAPHRAGM

CROSS REFERENCE TO RELATED APPLICATIONS

This application is closely related to my co-pending patent application titled, "ABRASION RESISTANT PLASTIC BONDED TO A FLEXIBLE DIAPHRAGM" filed on May 6, 1996 and bearing Ser. No. 08/643,604 and to my co-pending patent application titled, "INERT PLASTIC COATED FLEXIBLE TYPE DIAPHRAGM FOR APPLICATION IN A SANITARY TYPE PUMP" which is being filed concurrently herewith. Each of these co-pending applications is assigned to the assignee of the present application. The teachings in each of these co-pending applications are incorporated herein by reference thereto.

FIELD OF THE INVENTION

The present invention relates, in general, to certain flexible diaphragm type pumps and pumping systems and, more particularly, this invention relates to flexible diaphragms that are utilized in such diaphragm type pumps and, still even more particularly, this invention relates to an improved insert type member that is molded into the body portion of such flexible diaphragm to which a piston rod-like member can be attached so as to provide a substantially uniform non-obtrusive type surface on such flexible diaphragm.

BACKGROUND OF THE INVENTION

As is generally quite well known in the prior art, flexible type diaphragms are an integral part of a large variety of pumps. In these prior art type flexible diaphragms a flange type member is normally used to hold the flexible diaphragm and secure it to the piston rod-like member which is positioned for reciprocal movement within the pump. These flexible diaphragms, that are currently being extensively utilized in these flexible diaphragm type pumps, have a hole disposed in the center of them through which the flange type member is secured to the piston rod-like member.

The flange type member used to hold such flexible diaphragm exhibits a metal surface that is exposed to the fluid and/or any other type material that is to be pumped. This exposed metal surface can, and oftentimes does, present a number of rather severe problems in certain applications known to applicant. This exposed metal surface, for example, can be a likely source of undesirable contamination. Furthermore, such exposed metal surface can be a place where a number of detrimental types of bacteria can grow.

Thus, in those particular applications which require very strict sanitary conditions be achieved, such as will normally be required in the food industry and/or in the medical field, it has usually been the practice for stainless steel to be the material utilized to make this flange type member. Even though stainless steel can be made to exacting sanitary conditions, the use of such stainless steel does not completely eliminate all of the sites where such detrimental bacteria may grow since there are crevices where the flange type member attaches to such flexible diaphragm.

Applicant is aware of a number of previous attempts to incorporate an insert type member within the body portion of these flexible diaphragms and thus present a highly desirable non-obtrusive type surface which will come into contact with the material being pumped. However, each of these prior attempts to incorporate such an insert type member within the body portion of these flexible diaphragms have been totally unsuccessful. The primary reason for this is that the required piston action of the pump has resulted in such insert type member being pulled out of the rubber diaphragm and the pump was left in an unusable and broken condition

SUMMARY OF THE INVENTION

The present invention provides an improved insert type member for utilization in a flexible diaphragm portion of certain pump types. This improved insert type member will enable such flexible diaphragm portion of such pump to be provided with a substantially uniform non-obtrusive surface area that will be in intimate contact with a predetermined type material to be pumped. Such improved insert type member will include a first disc-like portion. The first disc-like portion has each of a first predetermined size and a first predetermined configuration. There is a second disc-like portion having each of a second predetermined size and a second predetermined configuration. This second disc-like portion is secured to a first surface of such first disc-like portion and this second disc-like portion extends from such first surface of the first disc-like portion for a predetermined distance. In addition, such second disc-like portion is disposed substantially in a center portion of such first surface of the first disc-like portion of such improved insert type member. A predetermined plurality of apertures, having a third predetermined size and a third predetermined configuration, are formed through such first disc-like portion. Such predetermined plurality of apertures provides an overall predetermined open area through such first disc-like portion for receiving rubber therein and, thereby, significantly improve the bonding of such improved insert type member to the flexible diaphragm portion of such pump. The final essential component of this improved insert type member is a securing means. This securing means is engageable at least with such second disc-like portion for securing the improved insert type member to an elongated piston rod member that is disposed for reciprocal type movement within such pump.

OBJECTS OF THE INVENTION

It is, therefore, one of the primary objects of the present invention to provide an improved insert type member to which a piston rod-like member can be attached and which can be molded into the body portion of a flexible diaphragm in order to provide a substantially non-obtrusive surface area that will be in intimate contact with the fluid and/or other type material to be pumped.

It is an additional object of the present invention to provide an improved insert type member to which a piston rod-like member can be attached which is molded into the body portion of a flexible diaphragm in a manner such that the piston forces being exerted on such improved insert type member would not release it from such flexible diaphragm.

Another object of the present invention is to provide an improved insert type member to which a piston rod-like member can be attached and which can be molded into the body portion of such flexible diaphragm in a manner such that a side of such flexible diaphragm disposed directly opposite such insert type member can be a substantially continuous piece of a preselected chemically inert type material.

Still another object of the present invention is to provide an improved insert type member which can be molded into the body portion of a flexible diaphragm and to which a piston rod-like member can be attached that is cost effective.

Yet another object of the present invention is to provide an improved insert type member which can be molded into the body portion of a flexible diaphragm and to which a piston rod-like member can be attached which will significantly reduce the maintenance requirements for pumps equipped with such improved insert type member.

A further object of the present invention is to provide an improved insert type member which can be molded into the body portion of a flexible diaphragm and to which a piston rod-like member can be attached which will significantly reduce the downtime for pumps equipped with such improved insert type member.

Another object of the present invention is to provide an improved insert type member which can be molded into the body portion of a flexible diaphragm and to which a piston rod-like member can be attached which is relatively easy to replace when necessary.

In addition to the numerous objects and advantages of the present invention described above, various other objects and advantages of the improved insert type member will become more readily apparent to those persons who are skilled in the flexible diaphragm type pump art from the following more detailed description of the invention, particularly, when such description is taken in conjunction with the attached drawing Figures and with the appended claims.

BRIEF DESCRIPTION OF THE PRESENTLY PREFERRED EMBODIMENT OF THE INVENTION

Figure 1:
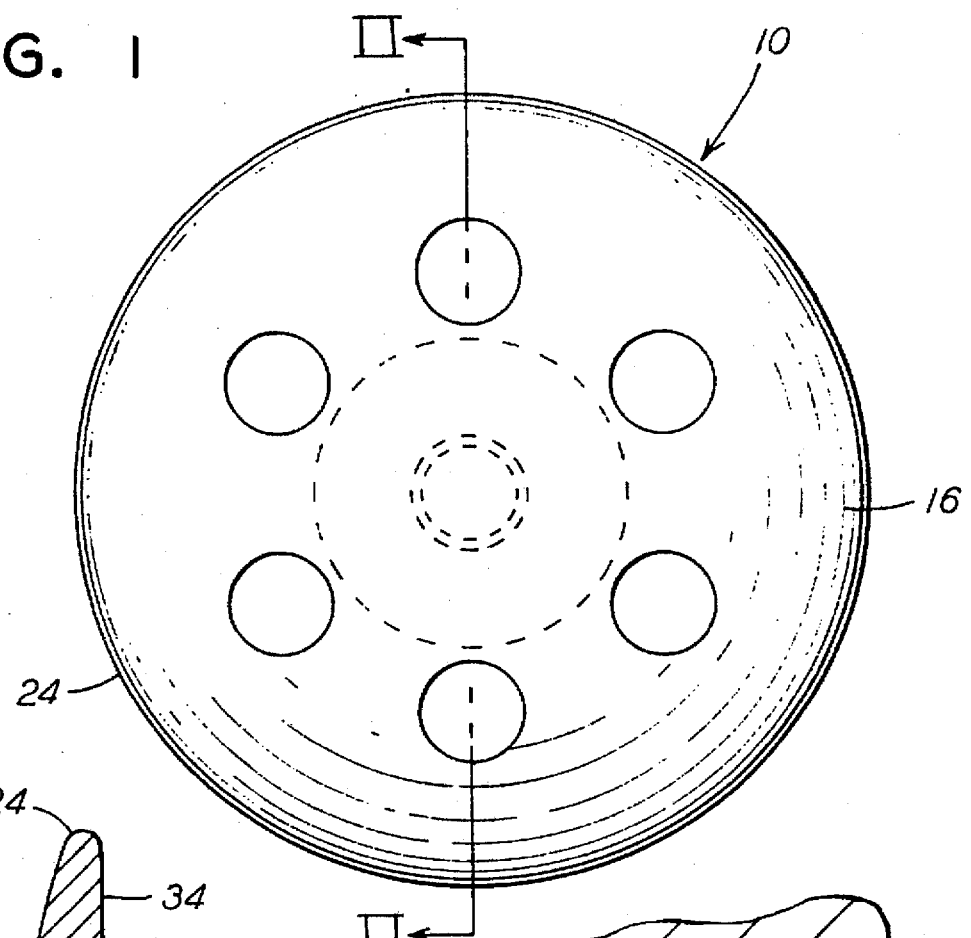
FIG. 1 is a top view of a presently preferred embodiment of the improved insert type member which can be bonded in a flexible diaphragm.

Prior to preceding to the much more detailed description of the present invention, it should he noted that, for the sake of clarity and understanding of the invention, identical components which have identical functions have been designated with identical reference numerals throughout the several views illustrated in the drawing Figures.

Figure 2:
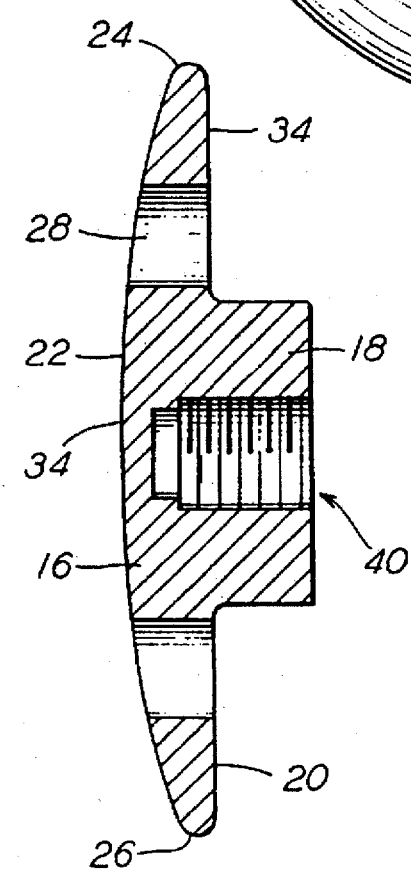
FIG. 2 is a cross-sectional view taken along the lines II—II of FIG. 1.
Figure 3:
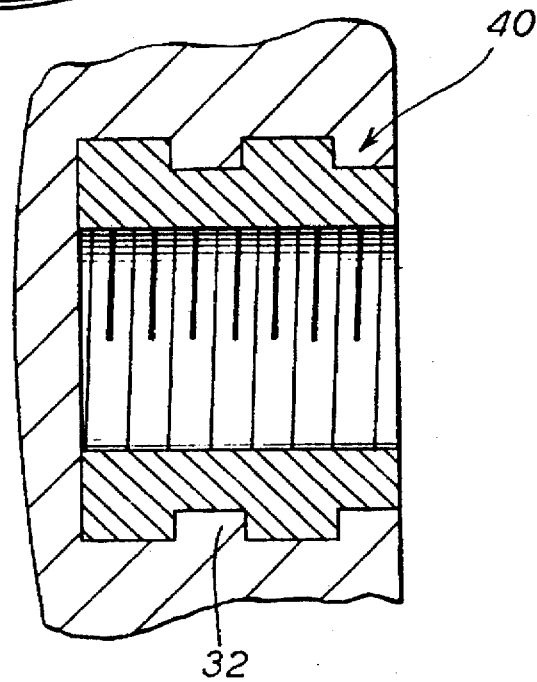
FIG. 3 is an enlarged fragmented view of a presently preferred securing means for securing the improved insert type member to a pump piston rod-like member.
Figure 4:
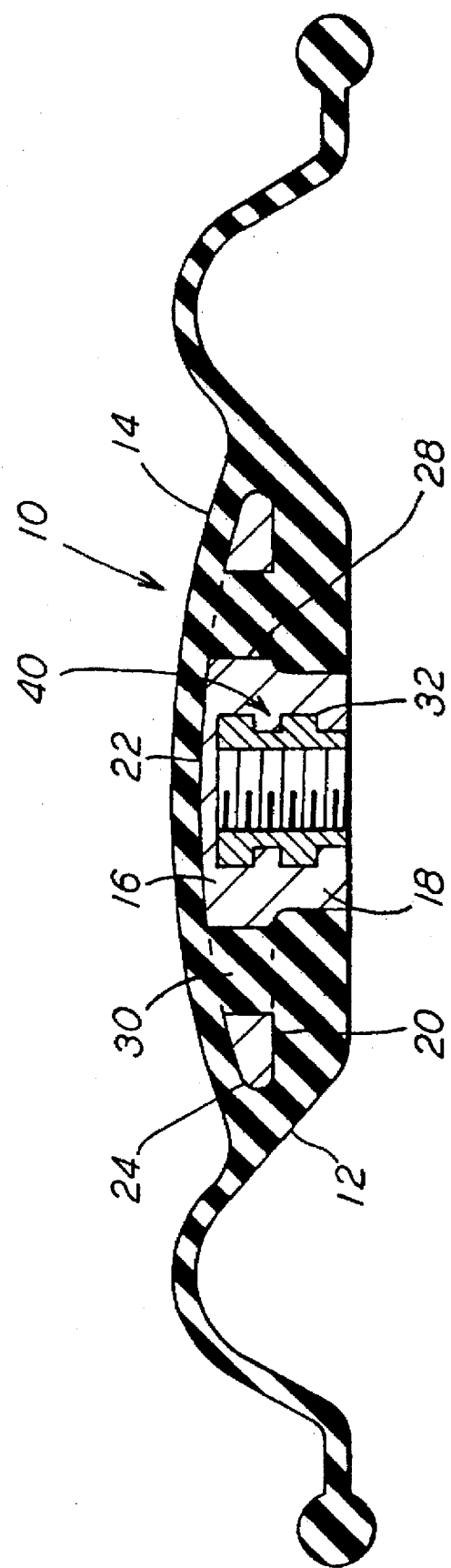
FIG. 4 is a cross-sectional view of a flexible diaphragm having the improved insert type member embedded therein.

Reference is now directed, more particularly, to FIGS. 1 through 4 of the attached drawings. Illustrated therein is one presently preferred embodiment of an improved insert type member, generally designated 10, produced according to the instant. invention. This improved insert type member 10 is adapted to he utilized in a flexible diaphragm portion 12 (FIG. 4) of a piston type pump (not shown). The insert type member 10 enables such flexible diaphragm portion 12 of the pump to he provided with a substantially uniform non-obtrusive surface area 14. This surface area 14 will he positioned within such pump for intimate contact with a predetermined type material to he pumped.

Such improved insert type member 10 will include a first disc-like portion 16 having each of a first predetermined size and a first predetermined configuration. The improved insert type member 10 includes a second disc-like portion 18 having each of a second predetermined size and a second predetermined configuration. This second disc-like portion 18 is secured to a first surface 20 of such first disc-like portion 16.

This second disc-like portion 18 extends from the first surface 20 of such first disc-like portion 16 for a predetermined distance. In addition, such second disc-like portion 18 is preferably disposed substantially in a center portion of the first surface 20 of such first disc-like portion 16 of the improved insert type member 10.

In the presently most preferred embodiment of such improved insert type member 10, the first disc-like portion 16 will exhibit a generally round shape. Additionally, such first predetermined configuration of this first disc-like portion 16 will include a generally convex shaped second surface 22 which is disposed radially opposite the first surface 20. This first surface 20 of such first disc-like portion 16 will be a substantially flat surface.

Further, the peripheral surface 24 of such first disc-like portion 16 includes a radius type edge portion 26 that will be located adjacent at least one of the first surface 20 and such second surface 22 in the presently most preferred embodiment of the improved insert type member 10, according to the present invention, such peripheral surface 24 of such first disc-like portion 16 includes such radius type edge portion 26 located adjacent each of such first surface 20 and the second surface 22.

In this embodiment of the improved insert type member 10, such second predetermined configuration of the second disc-like portion 18 will be an elongated and generally round shaped configuration. In addition, in the particular embodiment presently being described, such predetermined distance that the second disc-like portion 18 will extend from the first surface 20 of such first disc-like portion 16, of the improved insert type member 10, will generally be between at least about 0.25 inch and about 0.4 inch.

Additionally, this elongated and generally round second disc-like portion 18 of such improved insert type member 10 will, preferably, have a diameter that is generally between at least about 0.94 inch and about 1.06 inches.

The improved insert type member 10 further includes a plurality of apertures 28. The plurality of apertures 28 have a third predetermined size and a third predetermined configuration. Such plurality of apertures 28 are formed through such first disc-like portion 16 in order to provide an overall predetermined open area through such first disc-like portion 16 for receiving a rubber compound 30 therein and thereby significantly improve the bonding capability of the improved insert type member 10 to such flexible diaphragm portion 12 of such pump. In addition, this rubber compound 30 provides the mechanism which enables the improved insert type member 10 to resist being pulled out of the flexible diaphragm portion 12.

In a presently preferred embodiment of such improved insert type member 10 the third predetermined configuration of at least one of such plurality of such apertures 28 will exhibit a shape that is generally round. In the most preferred embodiment, of the invention, such third predetermined configuration of each of the plurality of such apertures 28 will exhibit a shape that is generally round.

Additionally, the diameter of each of these generally round apertures 28 will generally be in a range of between about 0.35 inch and about 0.4 inch. Furthermore, in this improved insert type member 10, such overall predetermined open area provided by this plurality of such apertures 28 will generally be in the range of between about 10.0 percent and about 40.0 percent of the overall surface area of the convex shaped second surface 22 of such first disc-like portion 16 of the insert type member 10. In the presently most preferred embodiment of such improved insert type member 10, the overall predetermined open area provided by this plurality of such apertures 28 will generally be in the range of between about 15.0 percent and about 25.0 percent of such overall surface area of the convex shaped second surface 22 of such first disc-like portion 16 of the improved insert type member 10.

The final essential component of such improved insert type member 10 is a securing means, generally designated 40. Such securing means 40 is engageable at least with the second disc-like portion for securing the improved insert type member 10 to an elongated piston rod-like member (not shown) which is disposed for reciprocal type movement within such pump.

In the presently preferred embodiment of such improved insert type member 10, such securing means 40 will at least include a threaded aperture portion 32. This threaded aperture portion 32 of the securing means 40 will be formed in at least the second disc-like portion 18 of the improved insert type member 10. As is clearly illustrated in FIGS. 2 and 4, it is even more preferred for such threaded aperture portion 32 of the securing means 40 to extend completely through such second disc-like portion 18 and into the first disc-like portion 16 of the improved insert type member 10.

Such improved insert type member 10, in accordance with the presently preferred embodiment of the invention, will be produced as an integral one piece type casting from a preselected material. Such preselected material is selected from the group consisting of metal and plastic. Preferably, such preselected material will be metal. Such metal is preferably cast iron.

It is also presently preferred that at least a portion surface area of such improved insert type member 10 will be abraded prior to molding into the body portion of such flexible diaphragm portion 12 of such pump. Most preferably each surface of the improved insert type member 10 is abraded prior to molding into the body portion of such flexible diaphragm portion 12 of such pump. The abrading of each of such surfaces of the improved insert type member 10 is accomplished by at least one of sandblasting and chemically etching.

Furthermore, the improved insert type member 10, according to the presently preferred embodiment of the invention, will be coated with an adhesive layer 34 prior to molding into the body portion of such flexible diaphragm portion 12 of such pump. The presently preferred adhesive layer 34 to be utilized in this application is Thixon 2000.

While a presently preferred and a number of alternative embodiments of the present invention have been described in detail above, it should be understood that various other adaptations and/or modifications of the improved insert type member for use in flexible diaphragms may be envisioned by those persons who are skilled in the relevant art without departing from either the spirit of the invention or the scope of the appended claims.

I claim:

1. An improved insert type member for utilization in a flexible type diaphragm portion of a pump which will enable such flexible type diaphragm portion of such pump to be provided with a substantially uniform non-obtrusive surface area that will be positioned in such pump for intimate contact with a predetermined type material to be pumped, said improved insert type member comprising:

(a) a first disc-like portion, said first disc-like portion having both a first predetermined size and a first predetermined configuration;

(b) a second disc-like portion, said second disc-like portion having both a second predetermined size and a second predetermined configuration, said second disc-like portion being secured adjacent one surface thereof to a first surface of said first disc-like portion, said second disc-like portion extending from said first surface of said first disc-like portion for a predetermined distance and said second disc-like portion being disposed substantially in a center portion of said first surface of said first disc-like portion of said improved insert type member;

(c) a plurality of apertures formed through said first disc-like portion, said plurality of apertures having both a third predetermined size and a third predetermined configuration, said plurality of apertures providing an overall predetermined open area through said first disc-like portion for receiving a preselected rubber compound therein and thereby significantly improve bonding of said improved insert type member to such flexible type diaphragm portion of such pump; and (d) a securing means engageable at least with said second disc-like portion for securing said improved insert type member to an elongated piston rod-like member disposed for reciprocal type movement within such pump.

2. An improved insert type member, according to claim 1, wherein said improved insert type member is manufactured as an integral one piece type casting from a preselected material.

3. An improved insert type member, according to claim 2, wherein said preselected material utilized to produce such improved insert type member is selected from the group consisting of metal and plastic.

4. An improved insert type member, according to claim 3, wherein said preselected material is metal.

5. An improved insert type member, according to claim 4, wherein said metal is cast iron.

6. An improved insert type member, according to claim 1, wherein said first disc-like portion is generally round and said first predetermined configuration includes a generally convex shaped second surface disposed radially opposite said first surface and said first surface of said first disc-like portion is substantially flat.

7. An improved insert type member, according to claim 6, wherein a peripheral surface of said first disc-like portion includes a radius type edge portion adjacent at least one of said first surface and said generally convex shaped second surface.

8. An improved insert type member, according to claim 6, wherein said peripheral surface of said first disc-like portion includes said radius type edge portion adjacent each of said first surface and said generally convex shaped second surface.

9. An improved insert type member, according to claim 1, wherein said second predetermined configuration of said second disc-like portion is an elongated and generally round configuration.

10. An improved insert type member, according to claim 9, wherein said predetermined distance said second disc-like portion extends from said first surface of said first disc-like portion of said improved insert type member is generally in a range of between at least about 0.25 inch and about 0.4 inch.

11. An improved insert type member, according to claim 10, wherein said elongated and generally round second disc-like portion has a diameter of generally in a range of between about 0.94 inch and about 1.06 inches.

12. An improved insert type member, according to claim 1, wherein said third predetermined configuration of at least one of said plurality of said apertures is generally round.

13. An improved insert type member, according to claim 12, wherein said third predetermined configuration of each of said plurality of said apertures is generally round.

14. An improved insert type member, according to claim 13, wherein a diameter of said generally round apertures is generally in a range of between about 0.35 inch and about 0.4 inch.

15. An improved insert type member, according to claim 1, wherein said overall predetermined open area provided by said plurality of said apertures is generally in a range of between about 10.0 percent and about 40.0 percent of an overall surface area of said convex shaped second surface of said first disc-like portion of said improved insert type member.

16. An improved insert type member, according to claim 15, wherein said overall predetermined open area provided by said plurality of said apertures is generally in a range of between about 15.0 percent and about 25.0 percent of said overall surface area of said convex shaped second surface of said first disc-like portion of said improved insert type member.

17. An improved insert type member, according to claim 1, wherein said securing means at least includes a threaded aperture portion formed in at least said second disc-like portion of said improved insert type member.

18. An improved insert type member, according to claim 1, wherein at least a portion of said improved insert type member is abraded prior to molding into a body portion of such flexible type diaphragm portion of such pump.

19. An improved insert type member, according to claim 18, wherein each surface of said improved insert type member is abraded prior to such molding into such body portion of such flexible type diaphragm portion of such pump.

20. An improved insert type member, according to claim 19, wherein said each surface of said improved insert type member is at least one of sandblasted and chemically etched prior to such molding into such body portion of such flexible type diaphragm portion of such pump.

21. An improved insert type member, according to claim 1, wherein at least a portion of said improved insert type member is coated with a preselected adhesive layer prior to molding into such body portion of such flexible type diaphragm portion of such pump.

22. An improved insert type member, according to claim 21, wherein said preselected adhesive layer is Thixon 2000.

* * * * *